Feb. 14, 1956  W. H. HEATON ET AL  2,734,289
SHOE STIFFENER, INCLUDING A LAMINA OF POLYETHYLENE
Filed Dec. 22, 1952
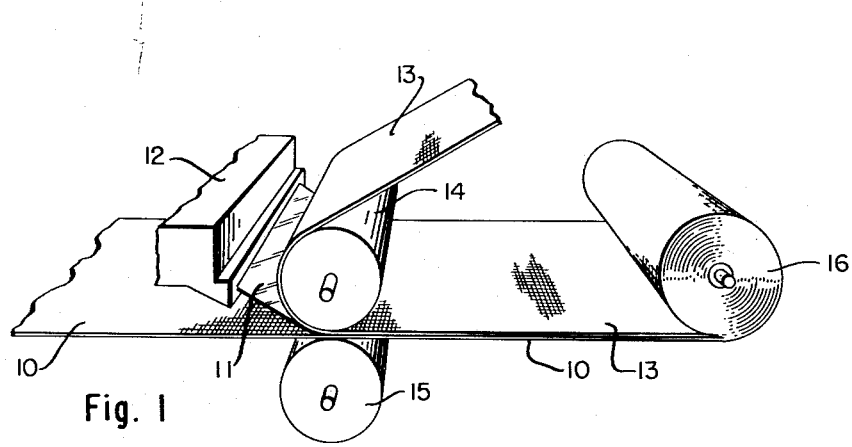
Fig. 1
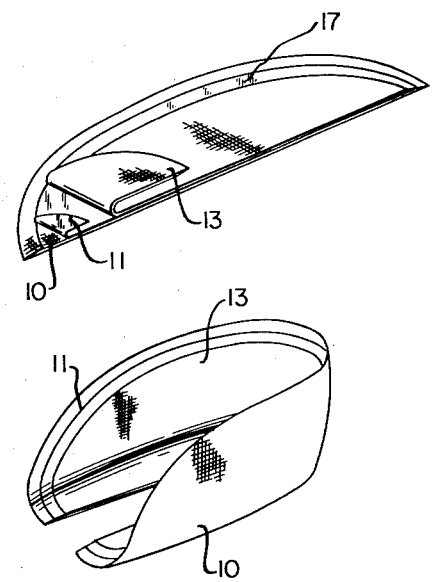
Fig. 2
Fig. 3
INVENTOR.
Walter H. Heaton & Ronald W. Morse
BY
Kenway, Jenney, Witter & Hildreth.
Attys.

United States Patent Office 2,734,289
Patented Feb. 14, 1956

2,734,289

SHOE STIFFENER, INCLUDING A LAMINA OF POLYETHYLENE

Walter H. Heaton, Franklin, and Ronald W. Morse, Newton, Mass., assignors to Beckwith Manufacturing Company, Dover, N. H., a corporation of New Hampshire Application December 22, 1952, Serial No. 327,384

1 Claim. (Cl. 36—68)

This invention comprises a new and improved shoe stiffener having special advantages when employed as a preformed or molded counter stiffener and incorporated in a shoe upper.

An insistent demand has developed in current shoemaking practice for counters that are more comfortable for the wearer than heretofore. Hard counters made entirely of stiff fibreboard are no longer acceptable. The characteristics now demanded are toughness and resilience together with a capacity to yield readily in receiving the wearer's foot and immediately to re-assume initial molded form when the distorting force is removed. Leather is satisfactory in many cases except for its high cost and tendency to dry out and become brittle. Many composite shoe stiffeners, satisfactory in other respects, tend to oxidize or become brittle or dusty in wear, or to separate and drop inside the upper to the discomfort of the wearer.

We have found that polyethylene in sheet form is an ideal stiffener in respect to toughness, flexibility and texture, but heretofore it has been found impossible to cement this material securely and permanently into a shoe upper. This difficulty, however, has been solved by our invention which, in one aspect, comprises, as a laminated stiffener, a thin sheet or ply of polyethylene having textile fabric bonded to its opposite surfaces thus supplying a cement-receptive medium.

In successfully completing our invention it was necessary to solve a second problem, viz. the permanent bonding of the polyethylene layer or ply to a textile fabric of the surface layers. Polyethylene is water-resistant and highly non-adhesive at ordinary temperature but it was found that it could be successfully bonded to textile fabric by extruding it in a thin sheet or film in a semi-solid or highly viscous condition, laying it hot upon the textile material or between textile sheets, and then immediately subjecting the laminations thus provided to pressure and cooling. This procedure results in a secure and permanent bond between the intermediate ply of polyethylene and the outer fabric laminations. The sheet material thus provided may be readily died out to form individual counter blanks and these may be skived and molded to form a complete molded counter ready for insertion in a shoe upper and capable of receiving an adequate supply of any cement commonly used in the industry.

An important advantage in the molded counter of our invention is that it may be handled exactly as any molded counter with which the industry is familiar, cemented with any counter cement now used, and securely and permanently retained thereby in the upper of the shoe.

These and other features of the invention will be best understood and appreciated from the following description of a preferred embodiment of a shoe counter stiffener and of the process of its production as illustrated in the accompanying drawings in which:

Fig. 1 is a view in perspective suggesting the steps of manufacturing the counter stiffener material in sheet form, Fig. 2 is a view in perspective of a counter blank showing the laminations detached at one corner, and Fig. 3 is a view in perspective of the blank as molded to serve as a counter stiffener.

As shown in Fig. 1, a facing or surface web 10 of cotton or Osnaburg is conducted in a horizontal path beneath a thin continuous sheet 11 of polyethylene represented as being extruded from the outlet nozzle 12 of an extruding machine provided with a die slit of the proper dimensions to extrude the sheet from 0.002 to 0.004 in thickness at a temperature of approximately 400°–600° F.

Closely adjacent to the extruding nozzle is located a pair of pressure rolls 14 and 15 and over the upper roll 14 is led a second web 13 of cotton or other fabric. The two fabric webs with the hot interleaved sheet of polyethylene are thus advanced and immediately subjected by the rolls to pressure and cooling.

The result is that the polyethylene is forced somewhat into the interstices of the fabric and bonded to it very firmly and permanently forming a laminated sheet that may be thereafter cut, skived, molded and otherwise treated as an integral structure. The cooled laminated sheet after passing the pressure rolls may be rolled up in a coil 16 for convenience in transportation.

The laminated sheet thus provided is now died into the form of the desired stiffener blanks as, for example, the counter stiffener blank shown in Fig. 2. The component plies 10, 11 and 13 are shown as being separated at one corner of the blank to make clear its laminated internal structure, but in practice the bond is so firm that they can be separated only with extreme difficulty. The blank is skived about its upper curved edge 17 exposing a marginal zone of the polyethylene ply and presenting a feather edge to this portion of the blank. In some cases it will be desirable to skive or pink the lower straight edge of the blank.

The skived blank of Fig. 2 may now be molded under heat and pressure into the shape of a complete counter as shown in Fig. 3; that is to say, into conformity with the heel and counter portions of a last. In its molded shape the counter has an inturned flange which is incorporated in the heel seat of the finished shoe, and as already intimated the lower edge of the counter blank may be skived or pinked to facilitate the formation of this flange. In the finished shoe the molded counter is incorporated as a moisture and perspiration resistant lamination between the outer integument and the lining of the upper. Its body is sufficiently stiff and resilient to maintain the fine lines of the lasted shoe, while its upper skived edge of reduced thickness is sufficiently flexible to yield readily and make a comfortable fit on the foot of the wearer. The gradation in flexibility of the skived upper edge of the counter, especially where the polyethylene ply is exposed by the skiving step, has been found particularly desirable in practice. Before placing the counter in the lining it is the practice to dip it in latex or other cement, and on account of the fabric facing layers of our improved counter it may thus be permanently and securely incorporated in the upper.

While we may employ in our improved shoe stiffeners polyethylene as commercially available, it is contemplated that in some cases a minor percentage of paraffin wax may be compounded with the polyethylene. The addition of 10% to 20% wax is useful in adjusting the melting point of the mixture and facilitates the molding operation. If desired a small amount of anti-oxidant such as "Ionol" may also be added to the mix. While we have referred specifically only to polyethylene, it will be understood that the employment of any other elastomer having substantially the same characteristics would fall within the scope of our invention.

Having thus disclosed our invention and described in detail an illustrative embodiment thereof, we claim as new and desire to secure by Letters Patent:

A new and improved stiffener for shoes comprising surface sheets of cotton fabric permanently bonded to both sides of an intermediate ply of tough and flexible polyethylene of the type which is extrudable in sheet form at 400°–600° F. and having their fabric partially embedded in the polyethylene ply thus forming therewith a composite laminated sheet, the said composite sheet having a body of three dimensional curvature and a skived margin exposing the polyethylene ply in a feather edged zone of tapering thickness and graduated increasing flexibility as compared to that of its unskived relatively stiff resilient body, the fabric surface sheets of the stiffener adapting it to be readily and securely cemented into a shoe upper as a complete preformed stiffener.

References Cited in the file of this patent

UNITED STATES PATENTS

| | | |
|---|---|---|
| 1,926,599 | Richter | Sept. 12, 1933 |
| 1,949,525 | Baynard | Mar. 6, 1934 |
| 2,148,336 | Ayers | Feb. 21, 1939 |
| 2,154,571 | Howard | Apr. 18, 1939 |
| 2,212,580 | Ayers | Aug. 27, 1940 |
| 2,237,344 | Evans | Apr. 8, 1941 |
| 2,292,441 | Habgood | Aug. 11, 1942 |
| 2,539,608 | Brophy | Jan. 30, 1951 |
| 2,607,712 | Storken | Aug. 19, 1952 |

OTHER REFERENCES

Plastics Magazine, pp. 39–43 and 100, Sept. 1944, P. D. (Copy in Div. 11.)